United States Patent Office 2,847,446
Patented Aug. 12, 1958

2,847,446
PRODUCTION OF ACRYLONITRILE

Frank Maslan, Brookline, and Edgar A. Stoddard, Jr., Brighton, Mass., assignors, by mesne assignments, to Escambia Chemical Corporation, Pace, Fla., a corporation of Delaware No Drawing. Application October 24, 1955
Serial No. 542,474

1 Claim. (Cl. 260—465.3)

This invention relates to the production of chemicals and in particular to an improved process for the production of acrylonitrile.

A principal object of the present invention is to produce high yields of acrylonitrile readily and cheaply by reacting hydrogen cyanide with acetylene in the vapor phase in the presence of a suitable catalyst.

Other objects of the invention will in part be obvious and will in part appear hereinafter.

The invention accordingly comprises the process involving the several steps and the relation and the order of one or more of such steps with respect to each of the others which are exemplified in the following detailed disclosure, and the scope of the application of which will be indicated in the claim.

For a fuller understanding of the nature and objects of the invention, reference should be had to the following detailed description.

It has heretofore been demonstrated that acrylonitrile could be obtained by the catalytic vapor phase reaction between hydrogen cyanide and acetylene, particularly acetylene streams containing less than about 15 percent acetylene. The preferred acetylene streams may be obtained by diluting pure acetylene with diluents such as nitrogen, hydrogen, carbon oxides, mixtures thereof and the like. Acetylene streams containing less than about 15 percent acetylene are produced directly by such well-known methods as the "Wulff" and "Sachsse" processes and like processes which utilize hydrocarbons or mixtures thereof as the starting materials.

One well-known method for producing acetylene streams containing less than about 15 percent acetylene is the "Wulff" process. This process essentially involves the thermal cracking of hydrocarbon gases at a high temperature. The "Wulff" process and modifications thereof are fully described and claimed in U. S. Patents 1,880,307, 1,880,308, 1,880,309, 1,966,779, 2,037,056, 2,236,534, 2,236,535, 2,236,555, 2,319,679, 2,475,093 and many others.

Another well-known method for producing dilute acetylene is the "Sachsse" process. This process involves the incomplete combustion of a hydrocarbon or mixtures of hydrocarbons to form acetylene streams containing less than about 15 percent acetylene. A more detailed discussion of "Sachsse" process may be found in U. S. Patents 2,195,227, 2,235,749 and 2,664,450.

The composition of the dilute acetylene streams obtained from the above process depends, to a great extent, upon the hydrocarbon or hydrocarbons employed as the starting material. However, these streams generally contain various proportions of acetylene (in amounts of less than about 15 percent), carbon oxides, hydrogen, nitrogen and unsaturated and/or saturated hydrocarbons. Thus, when hydrogen cyanide and a dilute acetylene stream undergo reaction, the small percentage of unreacted acetylene, in the presence of large percentages of other gases in the product stream, makes it uneconomical to recycle or recover any of the unreacted acetylene.

Hence, in order to obtain the highest conversions of acetylene and the highest degree of economy, it becomes necessary to conduct the reaction so as to use up as much acetylene as possible in order to eliminate the need for any acetylene recycle or recovery. On the other hand, hydrogen cyanide can be selectively recovered from the product stream of the reaction by relatively simple procedures of absorption and distillation. However, it has heretofore been the overwhelming practice to use an amount of acetylene which is in excess of the stoichiometric amount required to completely react with the hydrogen cyanide.

The present invention is directed to the vapor phase production of acrylonitrile by first passing a dilute acetylene stream and hydrogen cyanide over a suitable catalyst for reaction at an elevated temperature. The acetylene is preferably present in an amount which is greater than that stoichiometrically necessary to react completely with the hydrogen cyanide fed; thereafter there is added to the resulting reaction mixture an amount of hydrogen cyanide in excess of that stoichiometrically necessary to react with the remaining acetylene, and this mixture is passed over additional catalyst in at least one separate and successive operation.

In one preferred embodiment of the invention, the dilute acetylene stream contains less than about 15 percent acetylene. The reaction is preferably carried out at a temperature within the range of from about 450° C. to 700° C. and in the presence of a porous carbonaceous support impregnated with from about 3 percent to about 15 percent by weight of either an alkali metal hydroxide, cyanide or carbonate.

In another preferred embodiment of the invention, the mole ratio of acetylene to hydrogen cyanide in the first reaction is maintained under conditions which favor maximum conversion of hydrogen cyanide to acrylonitrile. Thus, it is preferred to employ an amount of acetylene which is in excess of that stoichiometrically necessary to completely combine or react with the hydrogen cyanide present. The mole ratio of acetylene to hydrogen cyanide in the second reaction is preferably such that the amount of hydrogen cyanide is in excess of that stoichiometrically necessary to react with the remaining acetylene.

If desired, the reaction can be carried out in a single reactor in such a manner as to effect a two-stage reaction. Also, the reaction can be carried out in more than two stages.

In another preferred embodiment of the invention, additions of acetylene and/or hydrogen cyanide may be introduced into the reactors at several points so as to obtain a better reaction and temperature control. As is known, there is a large temperature rise due to the heat release of this reaction. If all of the reactants are fed preheated into the inlet of a single reactor and are used up in the reaction, the temperature of the reaction gases is too high and causes a significant decrease in the conversion to acrylonitrile. Although in actual practice complete conversion of the reactants is not achieved, the temperature rise which occurs is such as to cause control difficulty.

In one embodiment of the present invention, better temperature control can be achieved by introducing or injecting some of the hydrogen cyanide and/or dilute acetylene into the reactor at temperatures significantly below the reaction temperatures. This injection cools the reaction gases at the cross section of the injection point. By suitable proportioning of the feed gases and injection of cool reactants, it is possible to maintain the reaction at the proper temperature. Thus, in the preferred process, for example, the first temperature rise can be kept to a controllable level by initially feeding into a first reactor a gaseous mixture of acetylene with a minor fraction of the stoichiometric amount of hydrogen cyanide required to form acrylonitrile. After this portion of the reaction has taken place, additional quantities of hydrogen cyanide are thereafter introduced into the first reactor at intermediate points. The quantity of hydrogen cyanide present, however, is maintained such that the acetylene is always present (in the first reactor) in excess of the stoichiometric amount required to react with the hydrogen cyanide. In order to maintain this preferred ratio, additional quantities of acetylene may also be injected into the reactor at one or more intermediate points. This new feed of hydrogen cyanide and/or acetylene is preferably at a low temperature so as to cause a decrease of from about 10° C. to 50° C. in the temperature of the reaction mass. This sufficiently decreases the reaction temperature so that further conversion results at the most desirable temperature levels. It is obvious that this multi-injection proposal of the present invention is suitable not only for the two-stage reaction described herein but also for the one-stage reaction between dilute acetylene and hydrogen cyanide.

Since certain changes may be made in the above process without departing from the scope of the invention herein involved, it is intended that all matter contained in the above description shall be interpreted as illustrative and not in a limiting sense.

What is claimed is:

A process for the vapor phase production of acrylonitrile which comprises passing a dilute acetylene stream containing less than about 15 percent acetylene and an amount of hydrogen cyanide which is theoretically less than that required to react with the acetylene present through a reactor maintained at a temperature between about 450° C. and 700° C. and containing an inert support carrying a catalyst selected from the class consisting of the alkali metal hydroxides, cyanides and carbonates, thereafter adding to the resultant reaction mixture an amount of hydrogen cyanide that is in excess of the theoretical amount required to react with the acetylene present in said reaction mixture, passing said mixture over additional catalyst, and recovering the acrylonitrile produced.

References Cited in the file of this patent

UNITED STATES PATENTS

| | | |
|---|---|---|
| 2,385,551 | Spence et al. | Sept. 25, 1945 |
| 2,413,623 | Harris | Dec. 31, 1946 |
| 2,419,186 | Harris et al. | Apr. 15, 1947 |
| 2,502,678 | Spaulding et al. | Apr. 4, 1950 |

OTHER REFERENCES

Migrdichian: "The Chemistry of Organic Cyanogen Compounds," 1947, p. 349.